J. Caswell.
Cutting Screws.
Nº 9,428.
Patented Nov. 30, 1852.
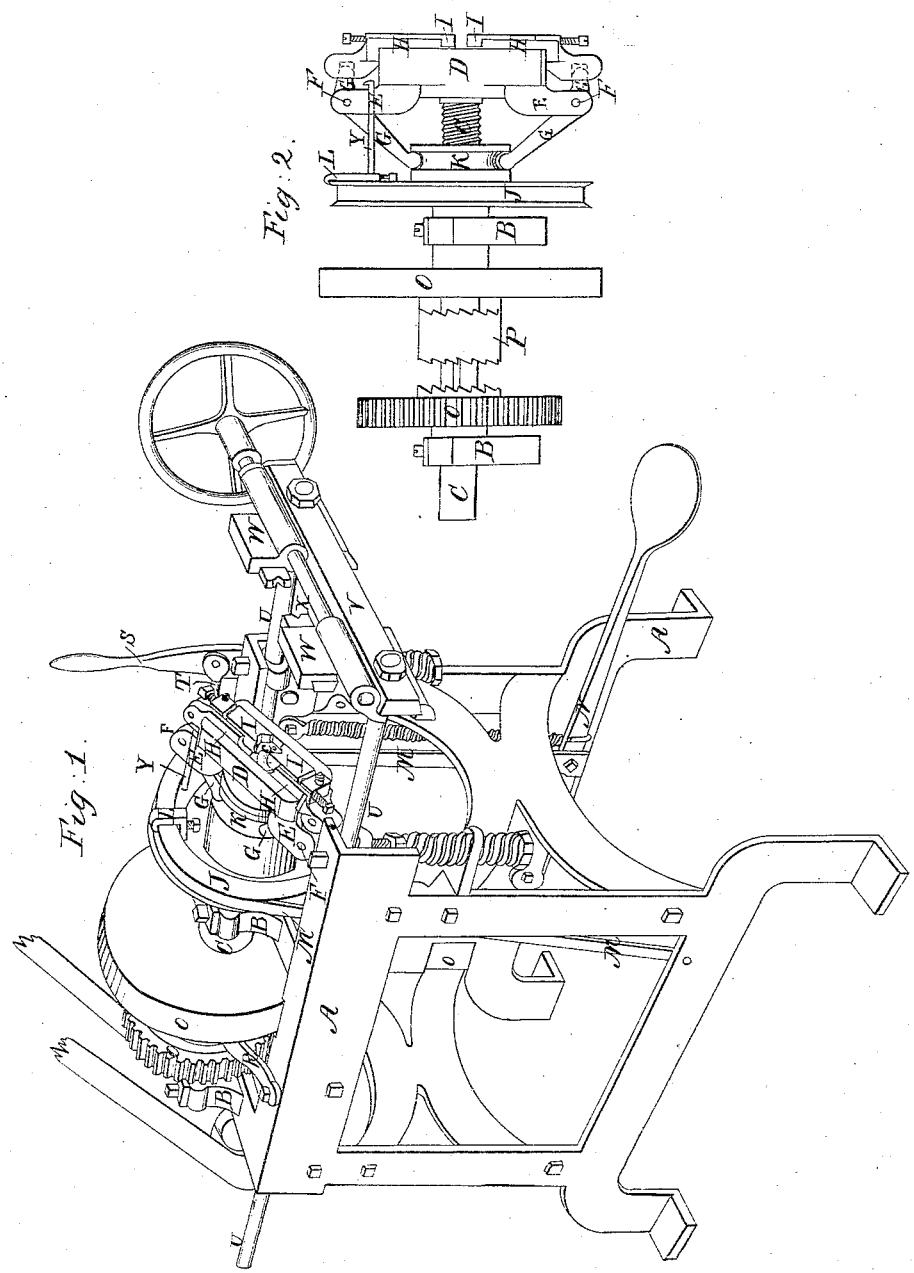

UNITED STATES PATENT OFFICE.

JOHN CASWELL, OF SYRACUSE, NEW YORK, ASSIGNOR TO ARCHIBALD C. POWELL.

MACHINERY FOR SCREWING BOLTS, &c.

Specification of Letters Patent No. 9,428, dated November 30, 1852.

*To all whom it may concern:*

Be it known that I, John Caswell, of the city of Syracuse, county of Onondaga, and State of New York, have invented new and useful Improvements in Machinery for Cutting Nuts and Screws; and I do hereby declare the following to be a full, clear, and exact description of the same, reference being had to the annexed drawings, making part of this specification, in which—

Figure 1 is a perspective view of the whole machine and Fig. 2 is a sectional view of the mandrel and the parts connected therewith.

The nature of my improvements consist first in certain devices by which screw bolts can be conveniently, rapidly and accurately cut of uniform size. One common defect in screw cutting machines heretofore in use is the difficulty of cutting bolts of uniform size so as to fit each and every nut through which the same tap has been passed. By means of the stop designated in the drawing by the letter L this difficulty is obviated in a simple, expeditious and accurate manner.

My 2d improvement consists in the substitution of a stationary vise and movable ways in contradistinction to the ordinary movable vise and stationary ways heretofore in use. The objection to the latter is that in consequence of the short bearing the vise is liable to be drawn up to the work in a diagonal plane, thereby causing it to bind upon the ways and producing a springing or jerking motion which often times breaks the tap in use. The peculiar advantages of movable ways and stationary vise are, 1st, compactness, requiring less length of machine and admitting of being shut together when not in use; 2d, convenience of working machine with care and expedition by allowing the workman to stand in front of his work instead of at the side; 3d, length of bearings or distance of way supports apart; 4th, the supporting the vise projecting in front of the bearing allowing it to yield more freely to imperfections in straightness of bolt or eccentricity of nut to be cut, thus protecting both the dies and tap from the liability of injury from such named causes and adjusting itself centrally with the dies when not influenced by said causes.

The following is a description of my machine.

A is a frame work which should be made strong, and well braced, upon which are 2 standards (B B).

C is a mandrel hollow from end to end which rests in boxes on the standards (B B).

D is a face plate or chuck firmly attached to the front end of the mandrel. Upon the back face of the chuck and near each end are two lugs (E E) or supports for the fulcrum pins (F F). Between these lugs are placed the knees of the bent levers (G G) resting upon the fulcrum pins.

H H are sliding die sockets which work in a dovetail groove cut lengthwise in the front face of the chuck D. In the outer end of each socket is a mortise to receive the front end of the bent levers. The dies I I for cutting screws are inserted into dovetailed grooves in the front face of the die sockets. The dies are held to their places by spiral springs inserted in the die sockets, under the dies.

J is a friction nut having a female screw through its eye, fitted to a screw cut upon the mandrel between the chuck and front standard.

K is a groove cut upon the front end of the hub of the friction nut to receive the back end of the bent levers.

L is a movable stop or gage attached to the front face of the friction nut in such a manner as to allow of its moving freely around the periphery except when it is desired to close the dies to a certain extent in order to cut a number of screws of any uniform size. In that event the stop is fastened to the friction nut by means of a set screw and in its revolution is brought in contact with the movable rod or finger shown at Y and the dies thus allowed to close to the required point and no farther. Upon the periphery of the friction nut is a groove to receive the friction band M. This band is attached at one end to the frame A below one side of the friction nut, then passes over the nut and down inside of the frame below the opposite side of the nut to the lever N.

G G are bent levers bent nearly at right angles, the knees of which are attached to the lugs by pins F F, the front ends entering the mortises in the die sockets and the back ends working in the groove in the hub of the friction nut. The front face of the friction nut is graduated.

Upon the mandrel and between the standards B, B, are placed two cog wheels O O between which is placed a clutch P, working upon a feather on the mandrel. The clutch is attached to a cross lever R which lever is connected with the handle S by means of the connecting rod T.

U U are movable ways working in yielding bearings and running lengthwise through the upper part of the frame, to the front ends of which is attached the cross bar V. Upon this bar are sliding jaws W (forming a vise for holding the bolts or nuts) which are worked by right and left hand screws upon a rod X. On the end of this rod is a hand wheel.

Y is a small rod or finger passing through the lug E and projecting sufficiently to come in contact with the stop L for the purpose of gaging the dies so as to cut the screw of any required size.

The operation of my invention is as follows: The mandrel may be made to revolve in either direction by connecting the clutch with one or the other of the cog wheels. Fasten the rod upon which the screw is to be cut between the jaws of the sliding vise the end projecting between the dies. By means of the set screw fasten the stop L, at any point in the rim of the friction nut which may be necessary for cutting the screw of the desired size; placing the foot upon the foot piece of the lever N and tightening the band M upon the friction nut the nut is held from revolving and is run back upon the screw on the mandrel thereby drawing back the ends of the levers in the groove of the hub and forcing in the die sockets and closing the dies upon the rod. When the stop L touches the projecting rod or finger the friction band ceases to hold the friction nut and it revolves with the mandrel. While the screw is being cut the rod is drawn by the dies into the hollow mandrel and the vise is drawn toward the chuck. On reversing the motion of the mandrel by means of the clutch and holding the friction nut as before from turning, the nut is run forward by the screw on the mandrel and the dies are thereby opened and the vise and rod may be withdrawn. The ways which support the movable vise are held in yielding bearings to avoid danger in breaking the dies and taps. In tapping nuts the nut may be placed between the jaws of the movable vise and the tap held in the chuck between the dies.

What I claim as my invention and desire to secure by Letters Patent is—

1. The movable ways running in yielding bearings back and forth under the machine and supporting the vise substantially as set forth.

2. The adjustable stop or gage on the side of the friction nut working in contact with the movable finger or any similar projection in the die chuck.

JOHN CASWELL.

Witnesses:
 PORTER MONTGOMERY,
 TOWNSEND ROSS.